Oct. 31, 1950  R. D. DOWNING ET AL  2,527,801
REMOTE CONTROL FOR GEAR SHIFT LEVERS
Filed Nov. 28, 1947
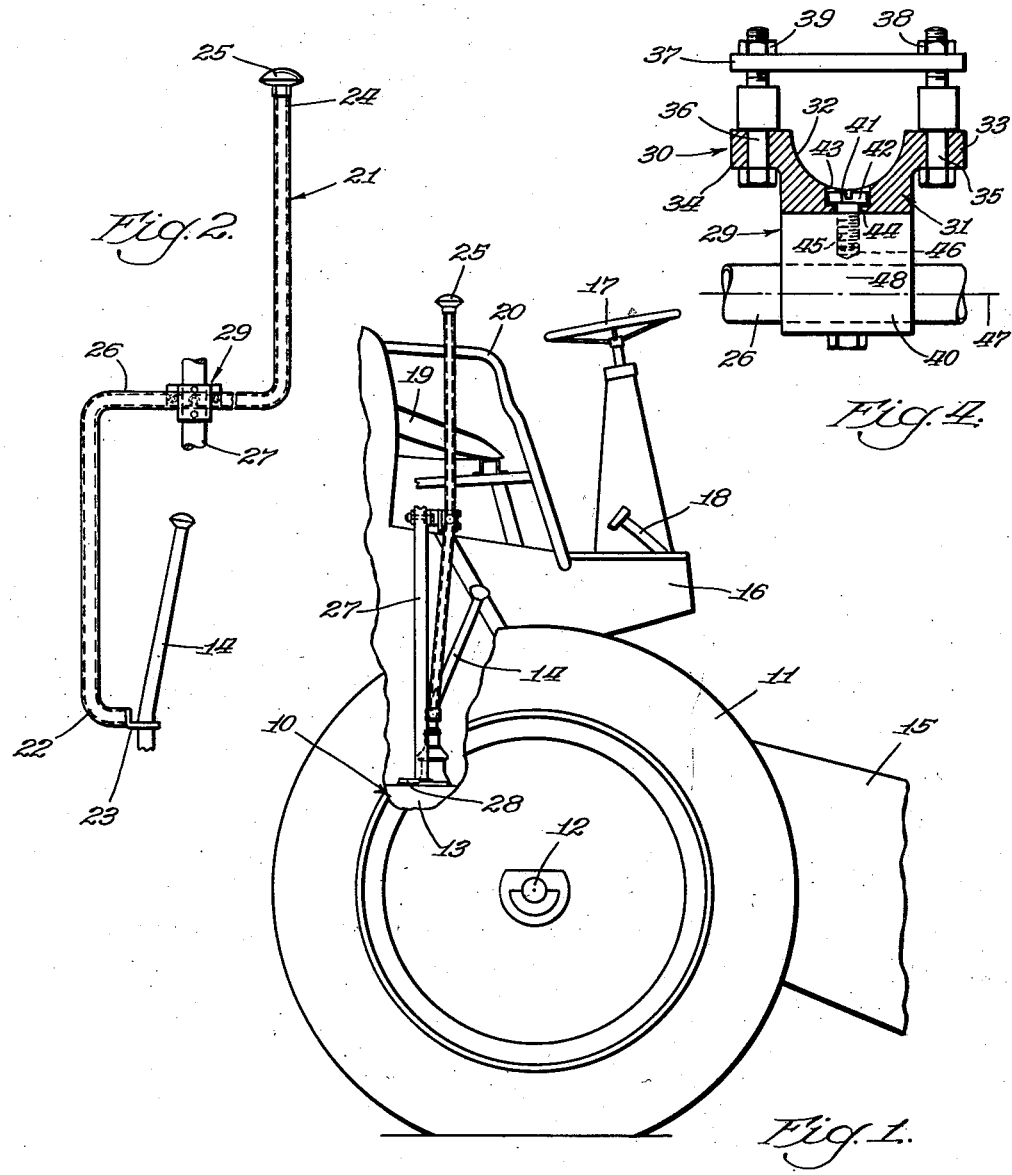
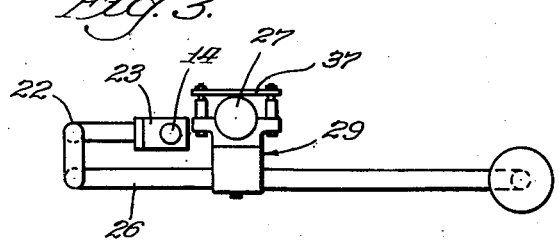
INVENTORS
Rexford D. Downing
Charles N. Adams Patented Oct. 31, 1950

2,527,801

UNITED STATES PATENT OFFICE 2,527,801

REMOTE CONTROL FOR GEARSHIFT LEVERS

Rexford D. Downing, Rock Island, Ill., and Charles N. Adams, Davenport, Iowa, assignors to International Harvester Company, a corporation of New Jersey Application November 28, 1947, Serial No. 788,412

1 Claim. (Cl. 74—480)

This invention relates to a new and improved remote control for gear shift levers.

A principal object of this invention is to provide an extension member for gear shift levers which permits operation of the gear shift lever from a remote station.

An important object of this invention is the provision of means for operating a gear shift lever from a remote position by similar movement of an extensible member which joins the gear shift lever through a bearing bracket permitting rotational movement through two directions.

Another and further important object of this invention is to provide a remote control for tractor gear shift levers for operation in conjunction with a tractor-mounted implement.

Another and still further important object of this invention is to provide an upwardly extending member adapted to engage the gear shift lever of a tractor and have a portion thereof extending upwardly to the operator's station on an agricultural implement mounted on the tractor in such a manner that the operator of the tractor-mounted implement although sitting in a direction facing what is normally considered the rear of the tractor may effect shifting of gears by duplicating the normal movement of the gear shift lever on the upwardly extending portion.

Other and further important objects of this invention will become apparent from the disclosures in the following specification and accompanying drawing, in which:

Figure 1 is a side elevational view of the remote control for gear shift levers as applied to a tractor-mounted agricultural implement.

Figure 2 is a front view of the remote control for gear shift levers as shown in the device of Figure 1.

Figure 3 is a top plan view of the device as shown in Figure 2.

Figure 4 is an enlarged detail of the bearing bracket employed in the device of this invention.

As shown in the drawing:

The reference numeral 10 indicates generally the normal rear portion of a tractor having large traction wheels 11 mounted on the transversely extending axle 12. A longitudinally extending body 13 carries a standard gear shift lever 14. Movement of the gear shift lever in a predetermined manner effects changing of the gear ratios of a transmission (not shown) associated with the tractor.

The large wheels 11 are normally the rear wheels of the tractor. However, for certain large agricultural implements which are mounted on tractors, the tractors are run in a reverse direction to accommodate the great loads which they must carry. In the device shown in Figure 1, a portion of a harvesting unit 15 is shown extending forwardly from the traction wheels 11. The harvesting unit 15 is adapted to cut standing grain and elevate it upwardly and rearwardly into a threshing mechanism (not shown). The height of a harvester thresher, or combine as it is ordinarily called, is much greater than that of a tractor, and it would be very difficult for an operator to maneuver the tractor-mounted harvester thresher from the ordinary tractor seat. An operator's station 16 is shown positioned considerably higher than the body portion 13 of the tractor, which usually constitutes the operator's platform or station of an agricultural tractor.

The operator's station 16 is provided with a steering wheel 17, brake levers 18, a seat 19, and an enclosing railing 20. An operator sitting in the seat 19 would have considerable difficulty in reaching the tractor gear shift lever 14 and most likely would not be able to effect gearing changes if there were not some means of control positioned adjacent the seat 19. Further the operator in the seat 19 is sitting in a reverse position to that of the operator in the regular tractor seat.

An elongated tubular extension member 21 has a lower portion 22 equipped with a bracket 23 adapted to encircle a lower portion of the tractor gear shift lever 14. The extension member 21 is provided with an upwardly extending portion 24 having hand engaging means in the form of a knob 25 at the top thereof. The device of this invention is not merely an elongation of the regular gear shift lever which would require an excessive amount of space to operate but rather is a device which when moved in the same manner and distances as that of the regular tractor gear shift lever 14 will effect a corresponding movement of the gear shift lever 14 in the opposite direction. The extension member 21 is offset as shown at 26 so that in addition to the vertical lower and upper portions 22 and 24 the device is provided with a horizontal portion as indicated by the numeral 26. A fixed or a stationary support 27 is fastened to the chassis or body 13 of the tractor as shown at 28 and extends upwardly therefrom. A bracket member 29 is attached to the support 27 by clamp means 30 which constitutes the rear portion of the bracket 29. The clamp 30 has a front portion 31 with a rearwardly opening socket 32 adapted to snugly engage the cylindrical upright support 27. The forward portion is provided with ears or lugs 33 and 34 diametrically opposite to each other and adapted to carry bolt members 35 and 36. A clamping plate 37 is slidable on the bolts 35 and 36 and is adapted to be brought toward the front portion 31 by means of nuts 38 and 39 which engage the threaded ends of the bolts 35 and 36. The bracket 29 is shown in clamped position on the support 27 in Figure 3 of the drawing.

The bracket 29 is provided with a bearing 40 positioned forwardly of the clamping member 30 and pivotally attached to the clamping member 30 by means of a screw 41 having an enlarged head 42 engaging a socket 43 and resting on an annular shoulder 44. The shank portion 45 of the screw 41 threadedly engages an opening 46 in the bearing block 40. The bearing block 40 is provided with a transversely extending tubular passage or sleeve through which the horizontal or offset portion 26 of the extension member 21 passes. The tubular extension member is journally supported for rotation within the sleeve bearing about an axis through the tubular passage therein as indicated by the line 47. The bearing block 40 is rotatable about an axis through the bolt 41 as indicated by the line 48.

In operation an operator to effect driving of the tractor mounted implement engages the knob 25 of the extension member 21 and moves it in the same manner as he would the gear shift lever 14 in order to effect change of gearing of the tractor drive. The bracket 29, which may be termed a swivel bearing bracket, is positioned intermediate the upper and lower ends of the extension member 21, and by reason of the rotation of the extension member about both the axes 47 and 48 which are at right angles to each other, movement may be imparted from the upper portion 24 of the extension member to the lower portion 22. As the lower portion has the bracket 23 engaging the standard tractor gear shift lever 14 near the bottom thereof, a minimum of movement of the hand engaging portion 25 of the extension member 21 will be required to effect shifting of the tractor gears. The movement of the extension member 21 will correspond in magnitude to that of the gear shift lever 14 because of the attachment to the lower portion thereof and also the particular positioning of the swivel mounted bearing bracket 29. Although movement of the upper part of the extension member causes a directly opposite movement of the tractor gear shift lever, normal shifting is permitted in the remote station because of the reversal of direction of the tractor and the implement seats. In other words, the reverse movement of the gear shift lever by the extension member is compensated for by the reverse position of the operator. Hence regular shifting movement of the extension 24 by the knob 25 will effect a regular shifting movement of the tractor gear shift lever.

It is obvious that the remote control element for gear shift levers may be applied to any vehicle or engine and that it need not be associated with a harvester thresher mounted on a tractor. Numerous details of construction may be varied throughout a wide range without departing from the principles disclosed herein, and we therefore do not propose limiting the patent granted hereon otherwise than as necessitated by the appended claim.

What is claimed is:

In a rearwardly running tractor mounted implement, an auxiliary control for the regular tractor gear shift lever comprising a fixed support on the tractor mounted implement, a bracket attached to said support, a sleeve bearing swivelly mounted on said bracket, a tubular extension member including generally vertically disposed upper and lower portions and a generally horizontally disposed intermediate portion, said intermediate portion journally supported in said sleeve bearing, said lower portion engaging the tractor gear shift lever at a lower portion thereof in such a manner as not to interfere with continued operation of said tractor gear shift lever, and said upper portion of said tubular extension member positioned adjacent a remote operator's station facing in the direction of the rearwardly running tractor mounted implement, whereby movement of the upper portion by an operator will effect normal regular movement of the tractor gear shift lever.

REXFORD D. DOWNING.
CHARLES N. ADAMS.

REFERENCES CITED

The following references are of record in the file of this patent:

UNITED STATES PATENTS

| Number | Name | Date |
| --- | --- | --- |
| 1,488,077 | Turner | Mar. 25, 1924 |
| 1,671,375 | Oldfield | May 29, 1928 |
| 1,673,952 | Schmidt | June 17, 1928 |
| 1,773,496 | Osman | Aug. 19, 1930 |
| 1,846,394 | Hoge | Feb. 23, 1932 |
| 2,071,348 | Kurtz | Feb. 23, 1937 |
| 2,168,645 | Glidden | Aug. 8, 1939 |
| 2,221,976 | Kurtz | Nov. 19, 1940 |